A. J. McCAULEY.
CAR TRUCK.
APPLICATION FILED DEC. 8, 1911.
1,027,747.
Patented May 28, 1912.
2 SHEETS—SHEET 1.
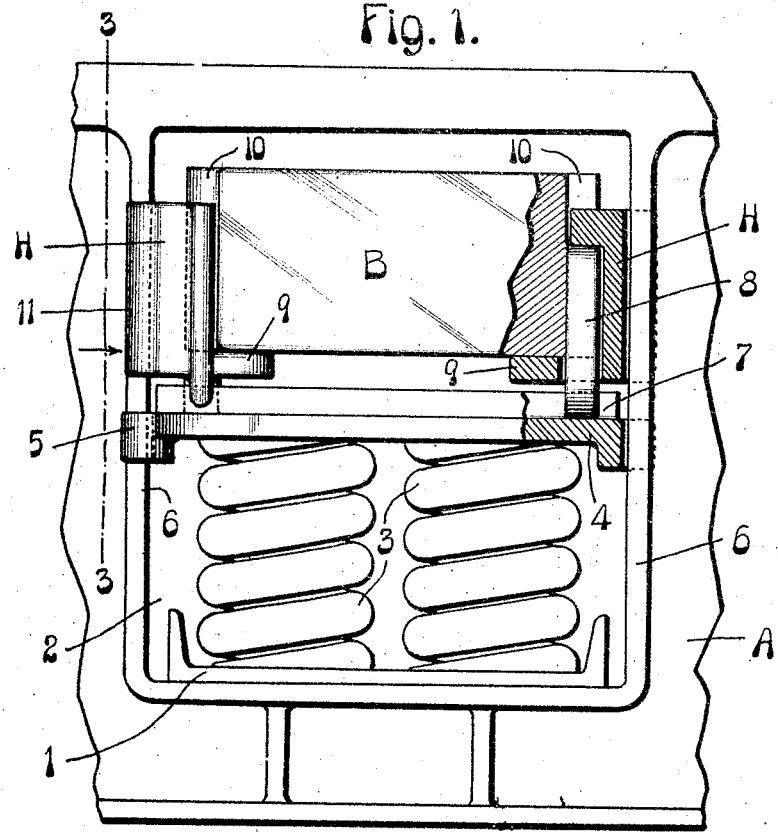
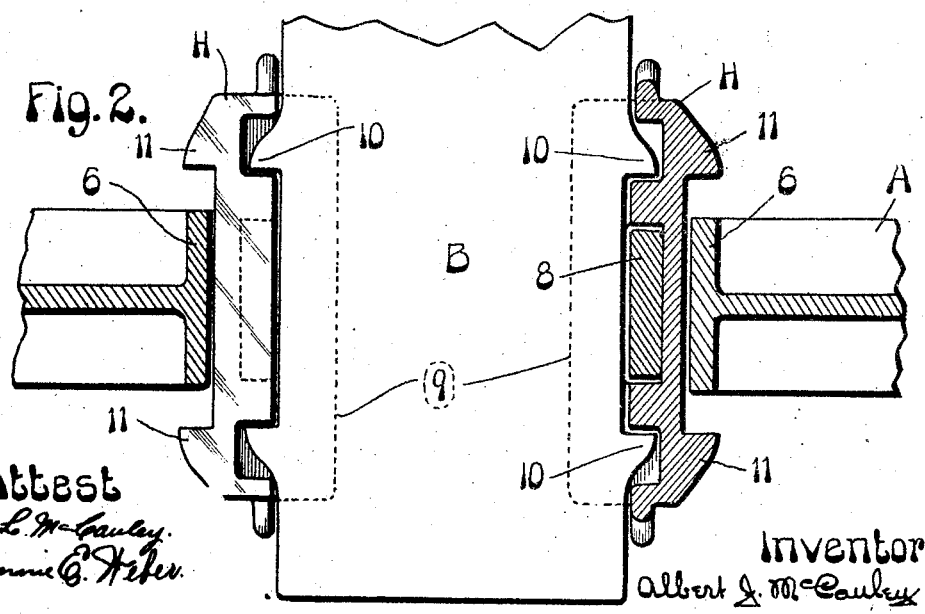
Attest
M. L. McCauley.
Fannie C. Weber.
Inventor
Albert J. McCauley A. J. McCAULEY.
CAR TRUCK.
APPLICATION FILED DEC. 8, 1911.
1,027,747.
Patented May 28, 1912.
2 SHEETS—SHEET 2.
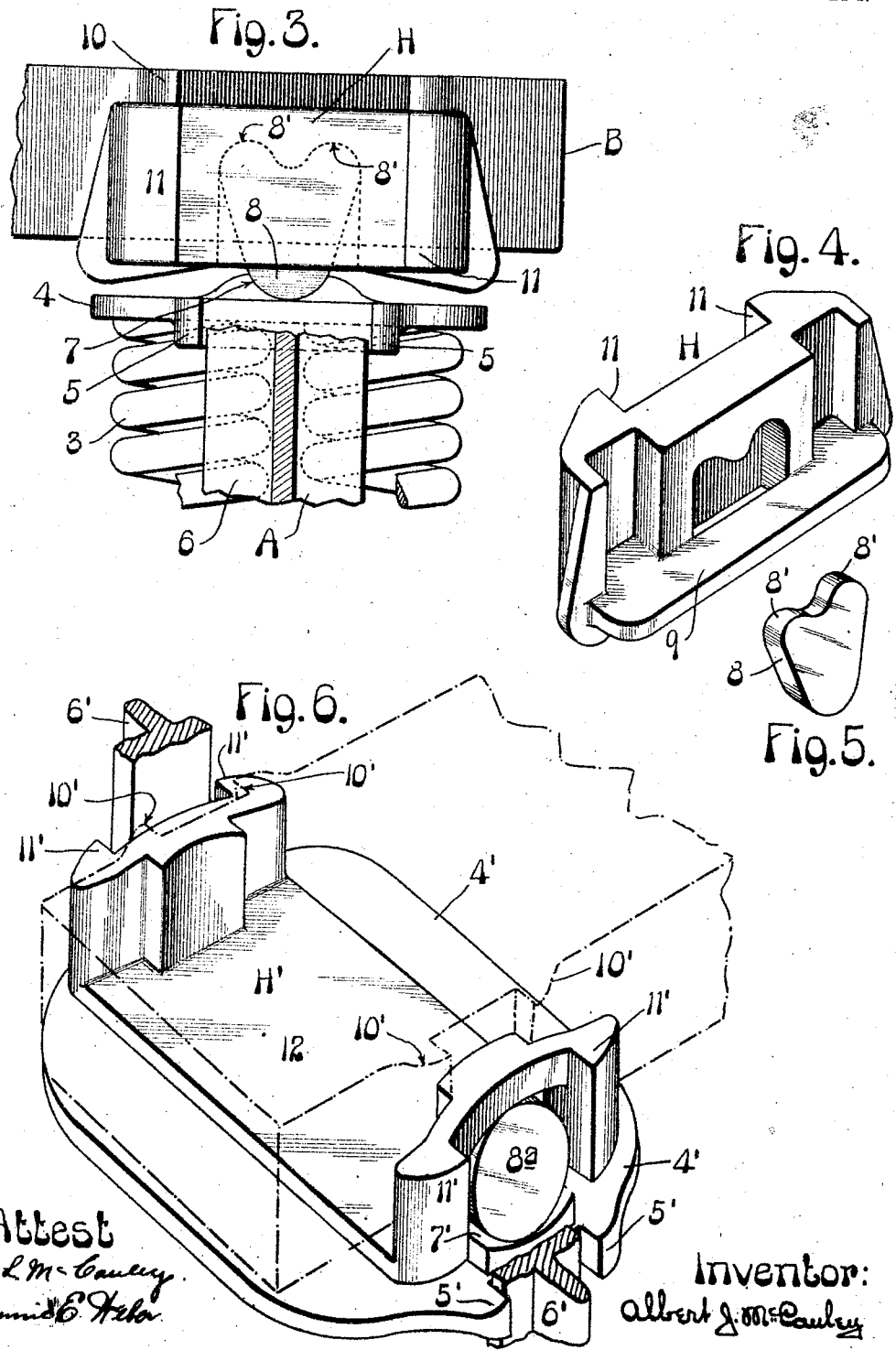

UNITED STATES PATENT OFFICE.

ALBERT J. McCAULEY, OF ST. LOUIS, MISSOURI.

CAR-TRUCK.

1,027,747. Specification of Letters Patent. Patented May 28, 1912.

Application filed December 8, 1911. Serial No. 664,549.

*To all whom it may concern:*

Be it known that I, ALBERT J. MCCAULEY, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, in which—

Figure 1 is a side elevation, partly in section, of a portion of a car truck embodying the features of this invention; Fig. 2 is a plan view, partly in section, of the parts shown in Fig. 1; Fig. 3 is a section taken on the line 3—3 of Fig. 1, the upper portion of the side frame being broken away; Fig. 4 is a perspective view of a bolster hanger; Fig. 5 is a perspective view of a rockable member adapted to be fitted to the bolster hanger; and Fig. 6 is a perspective view illustrating a modification.

This invention relates to improvements in car trucks of the lateral motion type, one of the objects being to produce an efficient lateral motion device which will allow the bolster to move laterally with respect to the truck frame and cause the bolster to return to normal position after such movement.

Another object is to provide a car truck having a bolster of the standard type and a truck frame of the standard type combined with a lateral motion device which allows the bolster to be very easily fitted to or removed from the truck frame.

In the accompanying drawings:—A, designates a portion of a well known type of truck frame which is shown merely to illustrate the function of the lateral motion devices, it being understood that this invention is not in any way limited to a truck frame constructed as herein shown. Where I refer to a truck frame in the claims, I mean to include a pair of side frames connected together, or any other suitable or desirable truck frame structure. However, as this invention may be used in connection with many well known truck frame structures, I do not deem it necessary to show or describe a complete truck frame.

The truck frame herein shown is provided with a spring seat 1 and a bolster receiving opening 2.

3 designates springs mounted on the spring seat 1 and surmounted by a vertically movable spring plate 4, said plate having lugs 5 which are slidably fitted to the side walls 6 of the opening 2. Curved seats 7 are preferably formed on the top face of the spring plate 4 to receive rockable members 8.

H designates bolster hangers resting on the rockers 8 and fitted to a bolster B. Each hanger H constitutes a bolster support and is preferably provided with a flange 9 upon which the bolster is seated. The bolster has the usual lugs or "column guides" 10 on its side faces and the hangers H are preferably fitted to the sides of the bolster between these lugs (see Fig. 2). The bolster hangers H and the rockable members 8 constitute a bolster carriage which allows the bolster to move laterally with respect to the truck frame and the hangers H being carried by the bolster during such lateral movement have abutments 11 adapted to engage the truck frame to limit the movement of the bolster.

The rockers 8 are compression members and preferably substantially heart-shaped as seen in Fig. 5, each of said rockers having three or more curved faces located in different vertical planes and adapted to engage curved seats on the spring plate 4 and hangers H. The hangers H move with the bolster during the lateral movements previously referred to, while the rockers 8 simply rock on the spring plate 4. Owing to the peculiar shape of the rockers 8 they are normally held in the position shown in Fig. 3 by the weight of the bolster and car body but when the bolster moves "laterally" one of the extensions 8' on each rocker moves away from its curved seat on the hanger H, and when the force causing such lateral movement has ceased the rockers and the bolster automatically return to the position seen in Fig. 3.

The bolster carriage shown in Fig. 6 is mounted on a vertically movable spring plate 4' having lugs 5' fitted to the truck frame members 6'. The spring plate 4' is preferably provided with curved seats 7' for the reception of circular rockers 8ᵃ upon which the bolster hanger H' is mounted. This bolster hanger comprises a horizontal bolster seat 12 and vertical side portions arranged between the bolster and the truck frame members 6'. The bolster (shown in dotted lines) has lugs 10' which interlock with the hanger H' and the hanger is provided with abutments 11' adapted to engage the truck frame members 6' to limit the movement of the bolster.

Having thus described the invention, what is claimed as new and desired to be secured by Letters Patent is:—

1. A lateral motion car truck comprising a frame, a bolster movable laterally with respect to said frame, and a lateral motion device supporting said bolster, said lateral motion device including bolster supports at the sides of the bolster, and rockable compression members upon which said bolster supports are mounted.

2. A lateral motion car truck comprising a frame, a bolster movable laterally with respect to said frame, and a lateral motion device supporting said bolster, said lateral motion device including bolster supports in the form of hangers and rockable members upon which said hangers are mounted.

3. A lateral motion car truck comprising a frame, a bolster movable laterally with respect to said frame, and a lateral motion device supporting said bolster, said lateral motion device including bolster supports in the form of hangers fitted to the bolster, and rockable compression members upon which said hangers are mounted.

4. A lateral motion car truck comprising a frame, a bolster movable laterally with respect to said frame, said bolster having lugs on its side faces, bolster supports carried by the bolster and fitted between said lugs, and rockable members upon which said bolster supports are mounted.

5. A lateral motion car truck comprising a frame, a bolster movable laterally with respect to said frame, springs supported by said frame, and a lateral motion device supported by said springs, said lateral motion device including bolster supports provided with abutments adapted to engage said frame, and rockable members upon which said bolster supports are mounted.

6. A lateral motion car truck comprising a frame, a bolster movable laterally with respect to said frame, springs supported by said frame, a vertically movable spring plate resting on said springs, and a lateral motion device supported by said vertically movable spring plate, said lateral motion device including rockers on said spring plate, and bolster supports in the form of hangers resting on said rockers.

7. A lateral motion car truck comprising a frame, a bolster movable laterally with respect to said frame, springs supported by said frame, a vertically movable spring plate resting on said springs, and a lateral motion device supported by said vertically movable spring plate, said lateral motion device including rockers fitted to said spring plate, and bolster supports in the form of hangers fitted to the side faces of the bolster and resting on said rockers.

8. A lateral motion car truck comprising a frame, movable bolster supports in the form of hangers provided with abutments adapted to engage said frame, movable members upon which said hangers are mounted, and a bolster fitted to said hangers.

9. A lateral motion car truck comprising a frame, movable bolster supports in the form of hangers provided with abutments adapted to engage said frame, rockable members upon which said hangers are mounted, and a bolster fitted to said hangers.

10. A lateral motion car truck comprising a frame, movable bolster supports in the form of hangers provided with abutments adapted to engage said frame, movable members upon which said hangers are mounted, and a bolster carried by said hangers.

11. A lateral motion car truck comprising a frame, springs supported by said frame, a vertically movable plate supported by said springs, rockable members resting on said plate, bolster supports resting on said rockable members, and a bolster carried by said bolster supports, said bolster supports being fitted to the side faces of the bolster, and provided with abutments adapted to engage said frame.

12. A lateral motion car truck comprising a frame, springs supported by said frame, a vertically movable plate supported by said springs, rockable members resting on said plate, bolster supports resting on said rockable members, and a bolster carried by said bolster supports, said bolster supports being fitted to the side faces of the bolster.

In testimony whereof I hereunto affix my signature in the presence of two witnesses, this 6th day of December, 1911.

ALBERT J. McCAULEY.

Witnesses:
M. L. McCAULEY,
FANNIE E. WEBER.